(12) United States Patent
Miadowicz et al.

(10) Patent No.: US 9,104,434 B2
(45) Date of Patent: Aug. 11, 2015

(54) PROPERTY ACCESSES IN DYNAMICALLY TYPED PROGRAMMING LANGUAGES

(71) Applicant: Microsoft Corporation, Redmond, WA (US)

(72) Inventors: Jedrzej ("Andrew") Miadowicz, Redmond, WA (US); Paul Adrian Leathers, Port Townsend, WA (US); Louis Lafreniere, Seattle, WA (US); Brahma Giri Abhijith Chatra, Issaquah, WA (US); Curtis Man, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/490,429

(22) Filed: Sep. 18, 2014

(65) Prior Publication Data

US 2015/0178057 A1    Jun. 25, 2015

Related U.S. Application Data

(63) Continuation-in-part of application No. 14/137,356, filed on Dec. 20, 2013.

(51) Int. Cl.
*G06F 9/44* (2006.01)
*G06F 9/45* (2006.01)

(52) U.S. Cl.
CPC ...................... *G06F 8/443* (2013.01)

(58) Field of Classification Search
CPC ..................................................... G06F 8/443
See application file for complete search history.

(56) References Cited

U.S. PATENT DOCUMENTS

| | | | |
|---|---|---|---|
| 6,996,804 B2 | 2/2006 | Stoodley | |
| 7,526,760 B1 | 4/2009 | Daynes et al. | |
| 8,244,775 B1 * | 8/2012 | Bak et al. | 707/802 |
| 8,392,881 B1 * | 3/2013 | Lund et al. | 717/116 |
| 8,539,463 B2 | 9/2013 | De et al. | |
| 2012/0185822 A1 * | 7/2012 | Lee et al. | 717/106 |
| 2012/0297360 A1 | 11/2012 | Lucco et al. | |

(Continued)

OTHER PUBLICATIONS

Li, et al., "TypeCastor: demystify Dynamic Typing of JavaScript Applications", In Proceedings of the 6th International Conference on High Performance and Embedded Architectures and Compilers, Jan. 24, 2011, pp. 55-65.

(Continued)

*Primary Examiner* — Philip Wang
(74) *Attorney, Agent, or Firm* — Kevin Sullivan; Kate Drakos; Micky Minhas

(57) ABSTRACT

A code generator may emit a direct access code for accessing a property of an object under conditions which promote type safety in a dynamically typed programming language. The direct access code accesses a value of the property using a hard-coded offset into the object's memory region. In some cases, the direct access code accesses the value after a single type check that guards a sequence of property accesses, including at least one prior sequence member. In some cases, type check code compares an object's type to a designated guard type of an equivalent type cache. An object type may be checked for property-specific access equivalence with types in the equivalent type cache by using a property equivalence record which is associated with the equivalent type cache. When types are not access-equivalent with regard to a property, type safety is preserved by emitting nondirect access code for accessing the property.

20 Claims, 8 Drawing Sheets

(56) References Cited

U.S. PATENT DOCUMENTS

| | | | |
|---|---|---|---|
| 2013/0061128 | A1 | 3/2013 | Lucco et al. |
| 2013/0067441 | A1 | 3/2013 | Lafreniere et al. |
| 2013/0205282 | A1 | 8/2013 | Lafreniere et al. |
| 2013/0205285 | A1 | 8/2013 | Pizlo |
| 2013/0212567 | A1 | 8/2013 | Fisher et al. |
| 2013/0305230 | A1* | 11/2013 | Inoue ............... 717/153 |
| 2013/0339936 | A1 | 12/2013 | Boulos et al. |
| 2014/0181591 | A1 | 6/2014 | Bijanki et al. |
| 2015/0067658 | A1* | 3/2015 | Hahnenberg ............... 717/148 |

OTHER PUBLICATIONS

Pizlo, Filip, "Introducing the WebKit FTL JIT", Published on: May 13, 2014, retrieved from <<https://www.webkit.org/blog/3362/introducing-the-webkit-ftl-jit/>>, 14 pages.

Ahn, et al., "Improving JavaScript Performance by Deconstructing the Type System", In Proceedings of the 35th ACM SIGPLAN Conference on Programming Language Design and Implementation, Jun. 9, 2014, 12 pages.

U.S. Appl. No. 14/137,356, Miadowicz, et al., "Execution Guards in Dynamic Programming", filed Dec. 20, 2013.

Hölzle, et al. "Optimizing Dynamically-Typed Object-Oriented Languages With Polymorphic Inline Caches", ECOOP '91 proceedings, Springer Verlag Lecture Notes in Computer Science 512, Jul. 1991, 18 pages.

Jay Conrod, "Polymorphic Inline Caches explained", retrieved from <<http://jayconrod.com/posts/44/polymorphic-inline-caches-explained, Jul. 24, 2011, 3 pages.

"Type system", retrieved from <<http://en.wikipedia.org/wiki/Type_system, Sep. 12, 2014, 8 pages.

"Inline caching", retrieved from <<http://en.wikipedia.org/wiki/Inline_caching, May 11, 2014, 4 pages.

International Search Report and Written Opinion, PCT/US2014/068680, mailed May 11, 2015, 13 pages.

Michael Bebenita et al: "SPUR: a trace-based JIT compiler for CIL", Proceedings of the 2009 ACM Sigplan Conference on Programming Language Design and Implementation, PLDI '09, vol. 45, No. 10, Oct. 17, 2010, pp. 708-725, XP055150227, New York, New York, USA, ISSN: 0362-1340, DOI: 10.1145/1932682.1869517, ISBN: 978-1-60-558392-1.

Kazuaki Ishizaki et al: "Adding dynamically-typed language support to a statically-typed language compiler: Performance Evaluation, Analysis, and Tradeoffs", Proceedings of the 8TH ACM SIGPLAN/SIGOPS Conference on Virtual Execution Environments, VEE '12, vol. 47, Jul. 7, 2012, pp. 169-180, XP055148922, New York, New York, USA, DOI: 10.1145/2151024.2151047, ISBN: 978-1-45-031176-2.

* cited by examiner

STATIC (AHEAD-OF-TIME) COMPILATION FOR FIELD ACCESS
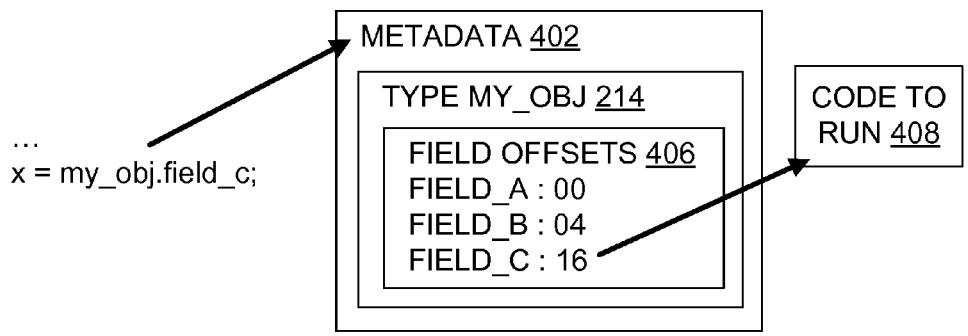
Fig. 4
INLINING AT MONOMORPHIC ROUTINE CALL SITE
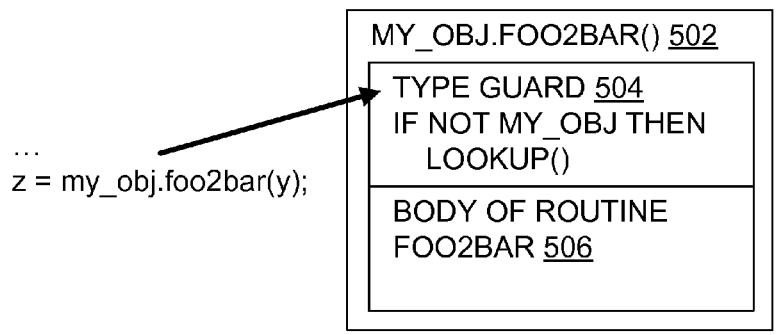
Fig. 5
| AN EXAMPLE OF A POLYMORPHIC INLINE CACHE 246 | 0 | TYP0: 0x1FFA0240 |
| --- | --- | --- |
| | | INDEX: 2 |
| | 1 | TYP1: 0x2ACE4B1 |
| | | INDEX: 2 |
| | 2 | TYP2: 0xFACB0432 |
| | | INDEX: 3 |
| | 3 | TYP3: 0xAA073173 |
| | | INDEX: 89 |
Fig. 6

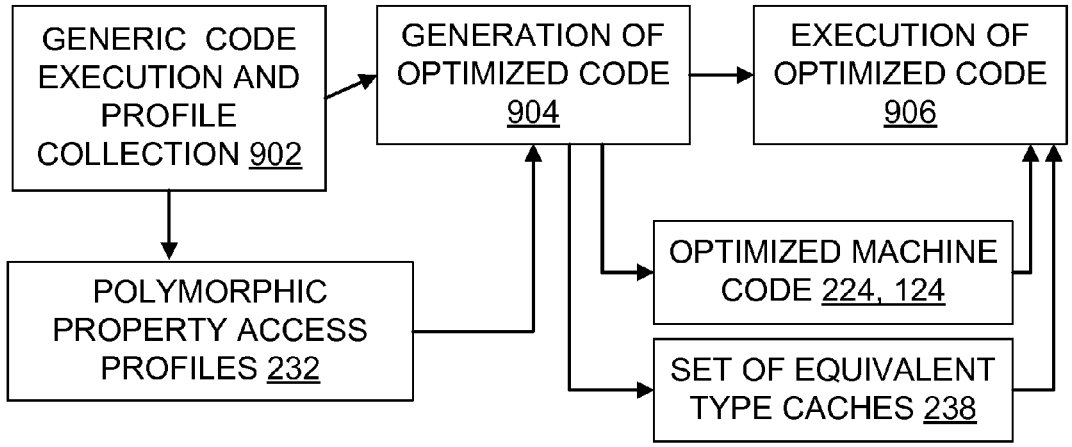
Fig. 9
AN EXAMPLE OF AN EQUIVALENT TYPE CACHE 238
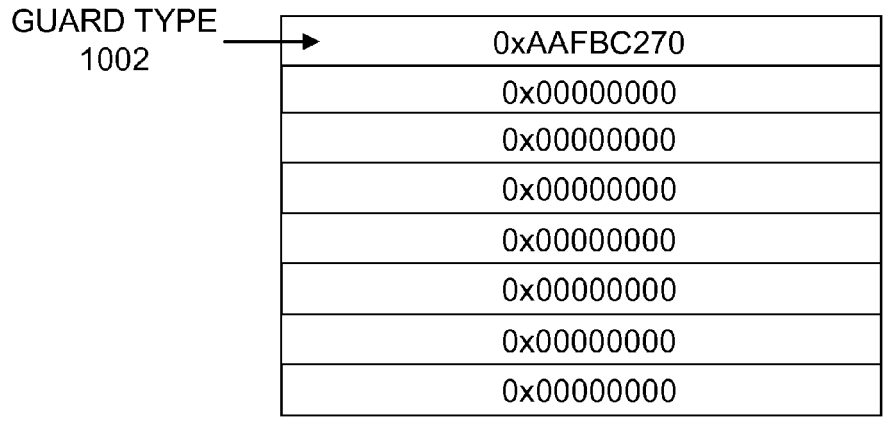
Fig. 10
Fig. 11

PROPERTY ACCESSES IN DYNAMICALLY TYPED PROGRAMMING LANGUAGES

RELATED APPLICATION

The present application claims priority to U.S. patent application Ser. No. 14/137,356 filed 20 Dec. 2013, titled "Execution Guards in Dynamic Programming", as a continuation-in-part, and also incorporates herein by reference the entirety of said application Ser. No. 14/137,356.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computing hardware frequently does not distinguish between bits (ones and zeroes) on the basis of what those bits are intended to mean to people. In a computing system, it often happens that when character strings, integer values, lists, tables, hierarchies, pieces of data structures, code sequences, and other data are moved about or otherwise manipulated, those manipulations are each accomplished using the same basic low-level hardware regardless of the data's intended meaning. Even the distinction between bits that are meant to be executed by a processor and bits that are not, is a distinction created by people and people's tools. The meaning of bits, and the actual impact of bit movements and bit manipulations, all depend ultimately on human interpretation. It is developers and other people who assign the ultimate meanings of bits in smartphones, tablets, laptops, networks, and other systems.

One way developers assign meaning to bits is to define software content and behavior using programming languages. One aspect of programming languages which helps document and implement particular meanings in software is known generally as "typing". Typing is also referred to using the phrases "type system" and "data types", among others. By associating data types with at least some of the variables, constants, routines, interfaces, and other constructs or artifacts in a program, software developers add meaning to the underlying bits. Without added meaning, program bits are merely sequences of ones and zeroes.

SUMMARY

Some embodiments or examples emit a direct access code for a property access to access a property of an object under specified conditions which promote type safety in a dynamically typed programming language. In some, the direct access code upon execution accesses a value of the property that is located at a hard-coded offset in the object's memory region. In some, the direct access code upon execution accesses the value after a single type check that guards a sequence of property accesses. In some cases, type check code compares an object type to a designated guard type of an equivalent type cache. In some, code determines whether the object type is equivalent to the types in the equivalent type cache with respect to the properties accessed by using a property equivalence record which is associated with the equivalent type cache.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope of any example.

FIG. 4 is a diagram illustrating aspects of static compilation to implement access to an object field (also called an object property);

FIG. 5 is a diagram illustrating aspects of a monomorphic routine call site;

FIG. 6 is a diagram illustrating aspects of a polymorphic inline cache (also called a PIC);

FIG. 9 is a data flow chart illustrating aspects of an architecture for object property access optimization;

FIG. 10 is a diagram illustrating aspects of an equivalent type cache (also called an ETC);

FIG. 11 is a diagram illustrating aspects of a property equivalence record (also called a PER);

DETAILED DESCRIPTION

Acronyms

Figure 1:
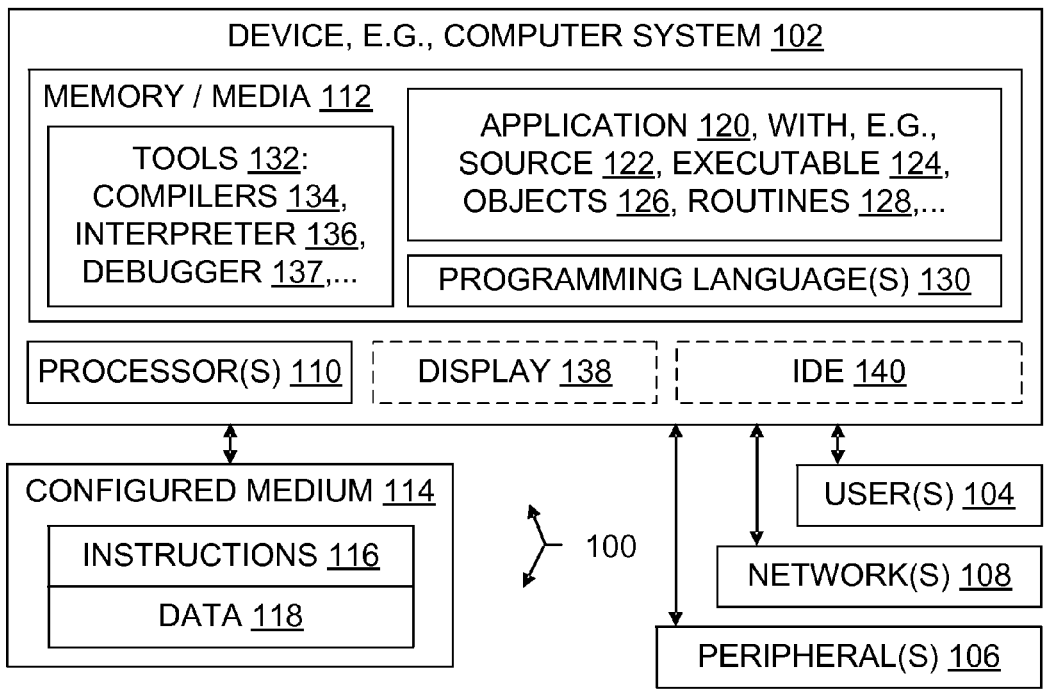
FIG. 1 is a block diagram illustrating a computer system having at least one processor and at least one memory which interact with one another under the control of software for building an executable version of an application and/or under the control of executable application software, as well as illustrating other items in an operating environment which may extend over multiple network nodes, and also illustrating aspects of some configured storage media.

Some acronyms are defined below, but others may be defined elsewhere herein or require no definition to be understood by one of skill.

ALU: arithmetic and logic unit
AOT: ahead of time
API: application program interface
CD: compact disc
CPU: central processing unit
DVD: digital versatile disk or digital video disc
ECMA: European Computer Manufacturer's Association, now Ecma International
ETC: equivalent type cache
FPGA: field-programmable gate array
FPU: floating point processing unit
GPU: graphical processing unit
GUI: graphical user interface
IDE: integrated development environment, sometimes also called "interactive development environment"
IoT: Internet of Things
ISO/IEC International Organization for Standardization/International Electrotechnical Commission
JIT: Just-in-time
PER: property equivalence record
PIC: polymorphic inline cache
RAM: random access memory
ROM: read only memory

Overview

Under certain circumstances described herein, a code generator may reduce the number of instructions generated to access a property of an object in a dynamically typed programming language. This reduction has corresponding effects such as decreased execution time for the generated code and smaller generated code, which in turn reduce processor load, energy usage, and code storage requirements. Examples of dynamically typed programming languages are numerous and generally familiar to those of skill in the art. Perhaps the most widely used example at present is the JavaScript language used in web browsers and elsewhere; it is an implementation of the ECMAScript language standardized in the ECMA-262 specification and ISO/IEC 16262.

Those of skill recognize challenges in efficiently accessing (loading or storing) properties in programs that are written in dynamically typed languages. The execution performance of JavaScript has received attention, for example, as part of the competition between web browser vendors.

Challenges in generating efficient property access code arise because objects in dynamically-typed programs lack a statically (at compile time) known structure (layout). Static layouts permit a compiler to emit concise processor instructions for loading/storing property values from/to offsets into the object's memory. As illustrated in FIG. 4, metadata 402 for some programs includes type layout information for statically known structures, and in particular includes field offsets 406 whose values are fixed at compile time before the program runs ("field" and "property" are used interchangeably herein). In these situations, a compiler can generate code 408 that includes the offsets directly as specific constant numeric values, instead of generating instructions to calculate an offset value later while the generated program code is running. Offsets and other values that are embedded in generated code at compile time as constants are said to be "hard-coded".

When offsets are not hard-coded, the location of a property's value in the object's memory must be determined at runtime every time the value will be accessed. Naïve implementation of such property access leads to unacceptable overhead, e.g., execution speeds in benchmark tests or consumer products fall below competitive levels. Therefore, various techniques have been employed to speed up property access. These techniques are referred to generally herein as "optimizations" with the understanding that an optimization is not necessarily the best possible approach—it is rather an approach which improves some measurable technical characteristic, e.g., optimizations are approaches which decrease execution time, reduce code size, increase reliability, improve security, and/or contribute to some other beneficial technical effect.

If a given function operates on only one and the same object every time, the location (offset) of a value of the property in the object can be cached on the first access. On subsequent accesses, the calculation of the property's location can use a simple lookup (which makes code faster) by getting the offset from the cache. This approach can be extended to multiple objects that share the same layout. If all objects are tagged with their layout ID (type), that type can be stored in a cache on the first access, and on subsequent accesses the cached offset can be used. This approach will be safe as long as the current object's type matches the type that is stored in the cache; this is called "monomorphic property access". In this context, "safe" means that the bits accessed by the executable code for the property access will be predictable and will actually be the bits the developer intended to access. Stated differently, executable code generated from program source code is "safe" in this regard if the execution produces the same computational results that one of skill would obtain (albeit much more slowly and tediously) by correctly manually simulating execution of the source code.

FIG. 5 illustrates a special case in which the property being accessed is a routine 502. A type guard 504 checks the type of an object at runtime to determine whether the object's type is the same as a previously cached type. If the types do not match, then a relatively expensive lookup calculation is performed to find the offset of the correct routine body. But if the current object's type matches the previously cached type, control passes to the body 506 of the routine, that is, the body of the property being invoked.

Figure 7:
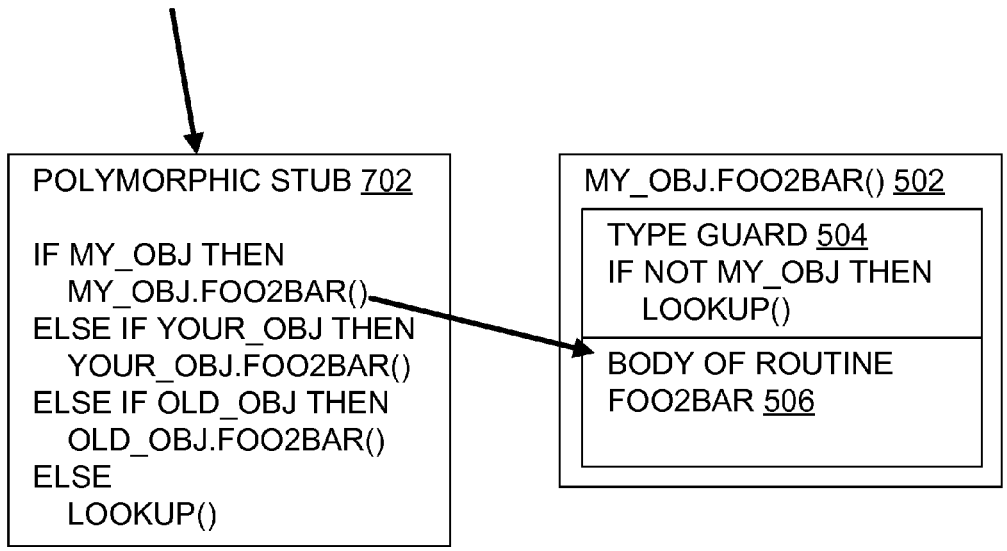
FIG. 7 is a diagram illustrating aspects of a polymorphic routine call site.

When the objects involved do not share a single layout, monomorphic access approaches are not safe. Sometimes a polymorphic approach is feasible. FIG. 7 illustrates a polymorphic approach for routine calls. A polymorphic stub 702 tests a current object's type against a short list of known (previously encountered) types and transfers control to a corresponding location when a match is found, or to a lookup calculation if no match is found. With regard to object property accesses, caching can be used to store a set of types and corresponding offsets where the value of the property in question is stored on objects of each type layout encountered. Such caching implements a polymorphic property access for a relatively small number of layouts, because caches do add to program storage requirements. Using a cache of two, four, or eight entries, for example, may yield an execution speedup which is acceptable without also increasing memory footprint beyond acceptable limits. Acceptability depends on the developer and the environment, but the number of possible combinations is small enough to make comparison of their respective technical impacts possible, in many development environments.

Polymorphic or monomorphic caching can substantially speed up a property access, but caching still carries the overhead of checking the type of the object against the type stored in the cache for each individual property access.

Now consider sample source code such as the following:
function foo(a, b) {
　return a.x−b.x+a.y−b.y;
}
var bs=new Array(10);
var as=new Array(10);
// . . . object creation and array population
for (var i=0; i<10; i++) {
　foo(as[i], bs[i]);
}

In this example source code, as in some other pieces of source code, a sequence of property accesses in a function involves the same object. The object could be a local variable, or an input parameter, for example. In such situations, the property access code could be further optimized by reducing the number of type checks, down to a single check performed at the beginning of the sequence. This optimization will be safe if the compiler can determine during compilation that the type of the accessed object cannot change during the sequence of accesses. If all property accesses involve objects of just one layout (type) (i.e., accesses are monomorphic), then the offsets at which each property in the sequence will be found can be known (e.g., from inline caches) at JIT-compile time, and the compiler can emit direct memory load or store instructions to the corresponding addresses using embedded offset constants for speed in place of a nondirect property access code, which may include locating a property's index in an object type property map and is more expensive to emit and to execute. Further, the overhead of the single runtime check for a sequence of property accesses can be spread over a potentially large number of property accesses, making each of them faster on average. This optimization may be referred to as "object type specialization".

However, if property accesses in the sequence involve objects of different layouts, then the offsets to the same-named property on objects of different layouts may be different. In these polymorphic situations, the correct property offset is generally not known during JIT-compilation because the type is chosen dynamically and different types have different layouts. Thus, the offsets cannot be directly embedded in the JIT-compiled code, even if the type of the object were to be verified at the beginning of the sequence. This renders object type specialization impractical for general polymorphic property access sequences.

Figure 8:
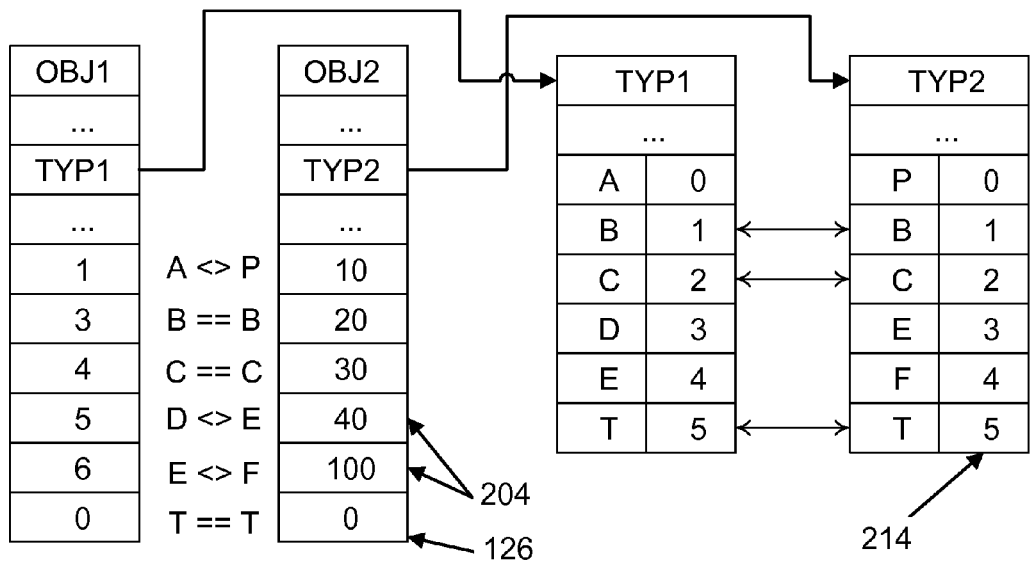
FIG. 8 is a diagram illustrating aspects of objects, object types, and object type layouts, and object property access equivalence or the lack thereof.

As taught herein, however, for a subset of such sequences an optimization can nonetheless be implemented. Even though different types have different layouts, in some cases the offset of a given property according to one type will match the offset of a correspondingly named property of another type. That is, even if multiple objects do not share the same layout, they may share a portion of it, such that some properties can be found at the corresponding offsets on both objects, even though this is not true of all properties. For example, object oa={a, b, c, d, e, f, g} and object ob={x, b, c, d, f, g} have different types, but their properties b, c, and d can be found on the same slots (slots 1, 2, and 3, respectively), while properties a, e, f, g, and x cannot. Note that the common subset of properties in this example are not the first properties on the objects; these layouts do not have a shared prefix. Thus, types to of object oa and type tb of object ob are offset-equivalent with respect to properties b, c, and d, but are not offset-equivalent with respect to all other properties listed. Offset-equivalence is a form of access-equivalence, the difference being that access equivalence considers not only offsets but also other aspects of property storage such as whether properties are writable and whether they have the same object prototype. In other words, same-named properties may have the same offset in two types that differ from one another in at least one other property. A special case is when the two same-named properties at the same offset are not the first property in either type. FIG. 8 shows another example, in which the equivalent properties are called out in an annotation using "=" between property names, and the non-equivalent properties are called out using "<>" between property names in the annotation. Note that in some cases the objects involved do not have multiple properties, but an optimization is still applicable and can yield performance benefits.

By determining when access equivalence is present—and also determining when it is not present—a compiler or other code generation engine can optimize accesses to that property across its same-named instances in two or more different types. A variety of situations can be optimized. Optimizations can be done for objects whose type layouts have a shared prefix, but a shared prefix is not required in every case. For example, there is no shared prefix in the FIG. 8 example because layout TYP1 slot 0 property A is not equivalent to layout TYP2 slot 0 property P, even though A and P have the same offset, because A and P and not the same property. In addition to offsets, some examples herein also examine other aspects of access for equivalence, by determining whether properties are local, whether they are writable, whether they are stored in auxiliary slots, and/or whether they have the same object prototype. These determinations, and related teachings herein, may be referred to collectively, individually, or in subsets as Equivalent Object Type Specialization.

In some examples of Equivalent Object Type Specialization, a compiler emits a direct access code for accessing a property of an object under conditions which promote type safety in a dynamically typed programming language. The direct access code accesses a value of the property using a hard-coded offset into the object's memory region. In some cases, the direct access code accesses the value after a single type check that guards a sequence of property accesses, including at least one prior access. In some cases, type check code compares an object's type to a designated guard type of an equivalent type cache. An object type may be checked for property-specific access equivalence with types in the equivalent type cache by using a property equivalence record which is associated with the equivalent type cache. When types are not access-equivalent with regard to a property, type safety is preserved by emitting nondirect access code for accessing the property. Equivalent Object Type Specialization may allow sequences of polymorphic properties to be executed as efficiently as sequences of monomorphic properties, for a set of objects whose types are access-equivalent with respect to the properties used in the sequence.

Nature of Examples

Some examples described herein may be viewed in a broader context. For instance, concepts such as caching, compilation, dynamic typing, hard-coding, object properties, offsets, polymorphism, sequences, type checking, and type layouts may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems and improve the function of computer systems. Other media, systems, and methods involving caching, compilation, dynamic typing, hard-coding, object properties, offsets, polymorphism, sequences, type checking, and/or type layouts are outside the present scope. Accordingly, vagueness, mere abstractness, lack of technical character, and accompanying proof problems are also avoided under a proper understanding of the present disclosure.

The technical character of examples described herein will be apparent to one of ordinary skill in the art, and will also be apparent in several ways to a wide range of attentive readers. First, some embodiments address technical problems such as execution performance costs of type-checking dynamically selected types, code optimization, type equivalence determination, shortcomings of monomorphic property access mechanisms, and preserving both type safety and performance despite variations in type layouts. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein guard a sequence of object property accesses with a single initial type check. Third, technical effects provided by some embodiments include a reduction in the number of type checks without a corresponding reduction in type safety, reduced executable code instruction segment size, and/or increased execution speed of ECMAScript-compliant languages. Fourth, some embodiments include technical adaptations such as equivalent type caches, property equivalence records, and code generators which use property access profile data to select between direct and nondirect access code emission.

Furthermore, some embodiments are directed to the technical problem of providing rapid yet type-safe access to properties of objects in dynamically typed programming languages. Some embodiments are directed to the technical problem of identifying individual properties that are access-equivalent within object types that have different layouts overall. Some embodiments are directed to the technical problem of tracking property access sequences which can be optimized by reducing type checks without thereby mistaking which data type is intended for the bits that are accessed. Other technical problems involved in examples of this disclosure will also be apparent to a person of skill in the art.

Some Terminology

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography, including the right to copy language into claims from other locations herein. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" may be used herein as a term of the computing science arts, and in that technical sense encompasses resource users, namely, coroutines, threads, tasks, interrupt handlers, application processes, kernel processes, procedures, and object methods, for example. "Process" may also be used herein as a patent law term of art, e.g., in describing a process claim as opposed to a system claim or an article of manufacture (configured storage medium) claim. Similarly, "method" may be used herein at times as a technical term in the computing science arts (a kind of "routine") and also at times as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Persons of skill will acknowledge that in some cases calculations simply cannot be performed rapidly enough and reliably enough by mental steps or by paper and pencil to provide the technical effects of an embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, avoiding, checking, comparing, creating, determining, emitting, executing, generating, guarding, loading, locating, running, storing, updating, using (and accesses, accessed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere propagated signal, for example. Unless expressly stated otherwise in a claim, a claim does not cover a signal per se. For the purposes of patent protection in the United States, a memory, a computer-readable storage medium, and any other computer-readable medium is not a propagating signal or a carrier wave, and it is not outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media, computer readable media, and computer readable memory, on the one hand, and (b) transmission media, also referred to as signal media or propagated signals, on the other hand. A transmission medium is a propagating signal or a carrier wave medium. By contrast, computer readable media, computer readable storage media, and computer readable memory are not propagating signal or carrier wave media. Unless expressly stated otherwise, "computer readable medium" means a computer readable storage medium, not a propagating signal per se.

An "embodiment" herein is an example. The term "embodiment" is not interchangeable with "the invention"; neither is the term "example". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, as an IoT node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation) or other game server. The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have code such as source code 122 and executable code 124, which includes objects 126, routines 128, and other constructs (sometimes referred to as "artifacts"). Source 122 is written in one or more programming languages 130. Executable code created from source in a given programming language 130 is sometimes also referred to as being in that language 130, but executable code is understood to include machine code. As used herein, "machine code" means low-level code, or computer code that is tailored to a particular hardware architecture or tailored to a particular virtual machine architecture. Some familiar examples of machine code include compiled code, microcode, firmware code, binary code, native code, object code, assembly language code, p-code, bytecode, dynamic link library code, and common intermediate language code.

As indicated, some environments 100 include software development tools 132 such as compilers 134, interpreters 136, and debuggers 137 which assist with software development by producing and/or transforming code 122, 124. The code 122, 124, the tools 132, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 138, and battery(ies), an operating environment may also include other hardware, such as buses, power supplies, wired and wireless network interface cards, and accelerators, for instance, whose respective operations are described herein to the extent not already apparent to one of skill.

A given operating environment 100 may include an Integrated Development Environment (IDE) 140 which provides a developer with a set of coordinated software development tools 132 such as AOT compilers, JIT compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages 130, programming models, and programs 120, as well as with technical endeavors outside the field of software development per se.

One or more items may be shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

One of skill will appreciate that the foregoing aspects and other aspects presented herein under "Operating Environments" may also form part of a given embodiment. This document's headings are not intended to provide a strict classification of features into embodiment and non-embodiment feature classes.

Systems

FIG. 9 illustrates one overall view of some systems 102. Block 902 represents code execution and profiling. Execution may include, for example running binary code, interpreting bytecode, and executing JIT-compiled code. Profile collection includes collecting information about types encountered during object property 204 loads and stores and aggregating that information into polymorphic inline caches 246 and/or other polymorphic property access profiles 232. The property accesses may begin as monomorphic accesses, where each access includes a type check, loading an offset, and then loading or storing a value at the offset. Per block 904, an optimization may remove some type checks and/or remove some offset loads, without reducing type safety. Optimization may utilize equivalent type caches 238 and other structures to produce optimized code 124 which includes, for instance, direct property access code 224 in place of nondirect code 228. Per block 906, the optimized code is executed as part of an application 120. Web browsers and scripts or other code run by them as plug-ins or otherwise are examples of applications.

Figure 2:
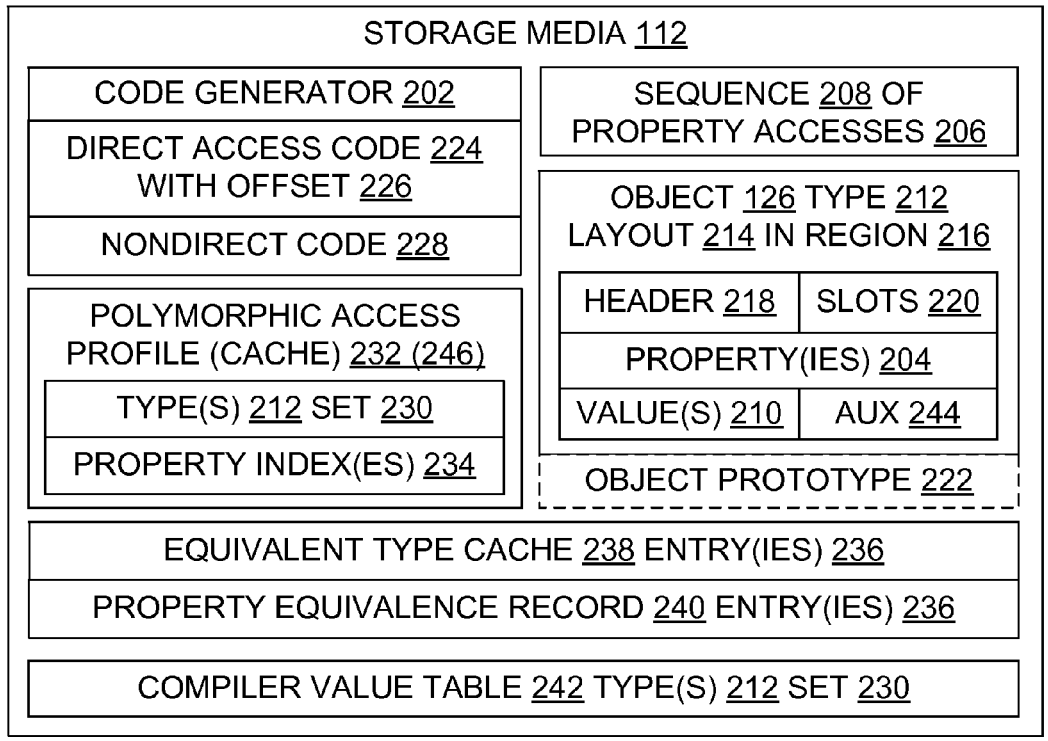
FIG. 2 is a block diagram further illustrating aspects of object property access code generation and aspects of object implementation in some architectures.

FIG. 2 illustrates aspects of an architecture which is suitable for use with some embodiments. A code generator 202 is typically located within a compiler 134. The compiler may be on one machine whereas the output of the code generator forms part of an application 120 on a different machine. The code generator 202 output includes in particular pieces of executable code 124 for accessing object properties 204, referred to as property accesses 206. A property access 206 may be bracketed by code 122, 124 that performs other operations, or the property access 206 may be in a sequence 208 of property accesses 206. Any given property access either reads or writes a property value 210 in a memory 112 region 216. Values 210 may be read either for use in a calculation such as an addition or a string print, or they may be read as part of invoking a property which is an object method. Accesses 206 that read a value are sometimes referred to as "loading", while those that write a value into an object property are sometimes referred to as "storing".

In some examples, objects 126 have defined types 212 which define the operations permitted on the object. Types 212 also implicitly or explicitly define a layout 214, which specifies the order, size, and interrelationships of object properties in memory 112 in a given implementation. A layout 214 may specify that some property values are stored in a property header 218 while others are stored at locations pointed to by a header entry, for example, or values may be stored in an auxiliary array 244. In a given implementation, each property 204 is allocated a certain number of bits or bytes in memory 112, and different properties may be allocated different amounts of memory. The memory allocated to a given property is sometimes referred to as that property's slot 220 when the actual size of the memory occupied by the property is not central to a discussion. Slots are often numbered beginning at zero, but some developers number them starting at one. Object layouts 214 may also be inherited from or influenced by object prototypes 222.

In some examples, code generator 202 output includes direct access code 224 with a hard-coded offset 226 for accessing an object property 204, and in some cases code generator 202 output includes nondirect code 228 for accessing an object property 204. Direct access code 224 is faster (sometimes an order of magnitude or more faster) than nondirect access code 228. Direct access code 224 presumes that the previously hard-coded offset 226 is still correct whereas nondirect access code 228 calculates a current offset.

In some examples, the code generator 202 chooses between emitting direct access code 224 and emitting nondirect access code 228 to implement a given property access 206 that is being compiled. As explained in detail herein, in some cases the choice between direct and nondirect property access code is based on one or more of the following, or uses one or more of the following to implement the chosen code: a set 230 of types 212 in a polymorphic property access profile 232 which may be implemented in particular as a kind of polymorphic inline cache 246 a.k.a. PIC 246, a property index 234, entries 236 of an equivalent type cache 238, entries 236 of a property equivalence record 240, a set 230 of types 212 in a compiler value table 242.

Some embodiments provide a computer system 102 with a logical processor 110 and a memory medium 112 configured by circuitry, firmware, and/or software to provide technical effects such as use of direct access code 224 in place of nondirect code 228 as described herein. In one example, a system 102 configured for generation and execution of machine code for property accesses in a dynamically typed programming language includes at least one processor 110 and a memory 112 in operable communication with the processor. This system 102 also includes at least one of the following: a direct access code generator 202, a generated direct access code 224, or a property equivalence record 240. Some systems include both the direct access code generator 202 and generated direct access code 224. Some systems include the direct access code generator 202, generated direct access code 224, and property equivalence record 240.

In some examples, a direct access code generator 202 emits a direct access code 224 for a property access 206 to access a property 204 of an object 126. The object 126 has a type 212. The direct access code 224 is emitted when the following conditions are satisfied: types 212 identified in a polymorphic inline cache 246 corresponding to the property access are equivalent, and a type set 230 retrieved from the polymorphic inline cache matches a type set 230 that is associated with the object's type in a compiler 134 value table 242. Familiar mechanisms may be used to retrieve type sets 230 from a compiler's collection of metadata.

FIG. 6 illustrates an example of a polymorphic inline cache 246, with types 212 implemented as memory addresses pointing to layout structures (see, e.g., layout structures TYP1 and TYP2 in FIG. 8) and with property indexes 234 into a map of property locations. The polymorphic inline cache 246 is associated with a given property access 206. In entry zero, for example, if the object a from the example source code is of type typ0, then the layout structure for a is at address 0x1FFA0240 and the property x of object a is located in slot 2. In some implementations, the PIC 246 has a variable size, such as having between four and thirty-two entries 236, and in some implementations, the number of PIC entries is adjusted by the compiler based on the number and distribution of object types encountered during execution of an application 120. A polymorphic inline cache 246 is an array-implemented example of a polymorphic access profile 232. For scope of disclosure purposes, any description herein may be considered as having been repeated with "polymorphic access profile" or its equivalent "polymorphic property access profile" substituted for "polymorphic inline cache" and reference numerals changed accordingly from 246 to 232, or vice versa.

In some examples, polymorphic inline cache 246 entries 236 contain property indexes 234. In operation, types 212 in a polymorphic inline cache associated with a given property access 206 are determined to be equivalent only after determining that all entries of the polymorphic inline cache contain the same property index as a first entry of the polymorphic inline cache. In some examples, types 212 in a polymorphic inline cache associated with a given property access 206 are determined to be equivalent only after determining that exactly one of the following conditions is satisfied: all types in the polymorphic inline cache describe objects 126 which contain the given property, or else all types in the polymorphic inline cache describe objects 126 that share a prototype 222 and the prototype contains the given property 204. In some examples, types 212 in a polymorphic inline cache associated with a given property access 206 are determined to be equivalent only after determining that exactly one of the following conditions is satisfied: all types in the polymorphic inline cache describe objects 126 which hold the value of the given property in a slot 220 on a header 218 of the object, or else all types in the polymorphic inline cache describe objects which hold the value of the given property in a slot on an auxiliary slot array 244 of the object.

In some examples, a system 102 includes a generated direct access code 224 for a property access to access a property of an object 126, and the property access 206 is a non-initial access that belongs to a sequence 208 of property accesses. The object has a type 212 and an allocated memory region 216. The direct access code 224 upon execution by a processor 110 accesses a value 210 of the property 204 which is located at a hard-coded offset 226 in the object's memory region 216. The direct access code 224 is optimized in that it accesses the value without requiring a further type check, after a comparison type check has determined that the object's type 212 matches an entry 236 in an equivalent type cache 238 (ETC 238) which is associated with the sequence 208 of property accesses.

FIG. 10 illustrates an example implementation of an ETC 238, in the form of a fixed size array with space for eight entries, each of which is the size of a type identifier, namely, a memory address of a type layout 214. In other implementations, a different number of entries 236 is used in an ETC 238, e.g., four entries, twelve entries, sixteen entries, or another number. The ETC 238 is created during compilation but used during execution. In some embodiments, it is not stored in a machine code executable file but is maintained instead in a runtime system data structure. The first entry 236 of the ETC 238 is treated as a guard type, and the other entries hold additional cached types 212.

In some examples, the generated direct access code 224 contains a sequence 208 of dynamic type property accesses 206 which are all guarded by a single type check using, e.g., a FIG. 10 ETC 238 guard type 1002. The sample source code above with function foo( ) is one of many possible source code 122 examples having a sequence 208 of dynamic type property accesses 206. Profile 232 data collection for such code can be accomplished with familiar mechanisms. The profile accesses illustrated may be polymorphic in the sense that object a has different types assigned at runtime, in the sense that object b has different types assigned at runtime, and/or in the sense that the type of an object a differs in layout from the type of an object b. Each of the accesses 206 has its own associated PIC 246; the accesses 206 are represented in the source by a.x, b.x, a.y, and b.y.

In some examples, the generated direct access code 224 contains a sequence of property accesses 206 of accessed properties of objects of different types 212, and these types 212 are equivalent with respect to the accessed properties in terms of layout2 214. This may occur, for example, when exactly one of the following conditions is satisfied: all accessed properties 204 are local properties, or else each accessed property 204 comes from a prototype 222 and all of the accessed properties come from that same prototype. In some examples, the generated direct access code 224 contains a sequence of property accesses of accessed properties of objects 126 of different types 212, and the property accesses 206 are either all inline (e.g., in a header 218 or accessible without indirection through a pointer), or else they are all in an auxiliary slot array 244.

In some examples, the system 102 includes a property equivalence record 240 which has one entry 236 for each property access 206 in a sequence 208 of property accesses that is guarded by a single type check. FIG. 11 illustrates one example implementation of a property equivalence record 240, which is suitable for environments 100 in which object properties 204 can be designated as writable or not writable, and in which object properties can be stored either inline or in an auxiliary array 244. In other examples, the column for tracking whether the property is writable would be removed if all properties are writable. Similarly, in other examples the column for tracking whether the property value is stored in a slot of an auxiliary array 244 would be removed if all properties are stored inline.

In some implementations, there is one property equivalence record 240 per property access 206 in which an explicit type check is used for that access to ensure type safety. The property equivalence record 240 has one entry for each property access in a given sequence of accesses that is guarded by a single type check. Thus, after an initial access 206, the property equivalence record 240 helps protect later accesses of the same object in the sequence. For instance, in the sample source code, if a.x and a.y access properties of the same type of object a, then one optimization avoids (omits, skips) a type check on access a.y after a check has been done on access a.x.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly and linguistically with the embodiment. Software processes may be users 104.

In some embodiments, the system includes multiple computers or other devices 102 connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, a code generator 202 may emit codes 224, 228 on one device/system 102 in a networked cloud, and copies of an application 120 containing that code may be stored on yet other devices within the cloud.

Processes

Figure 3:
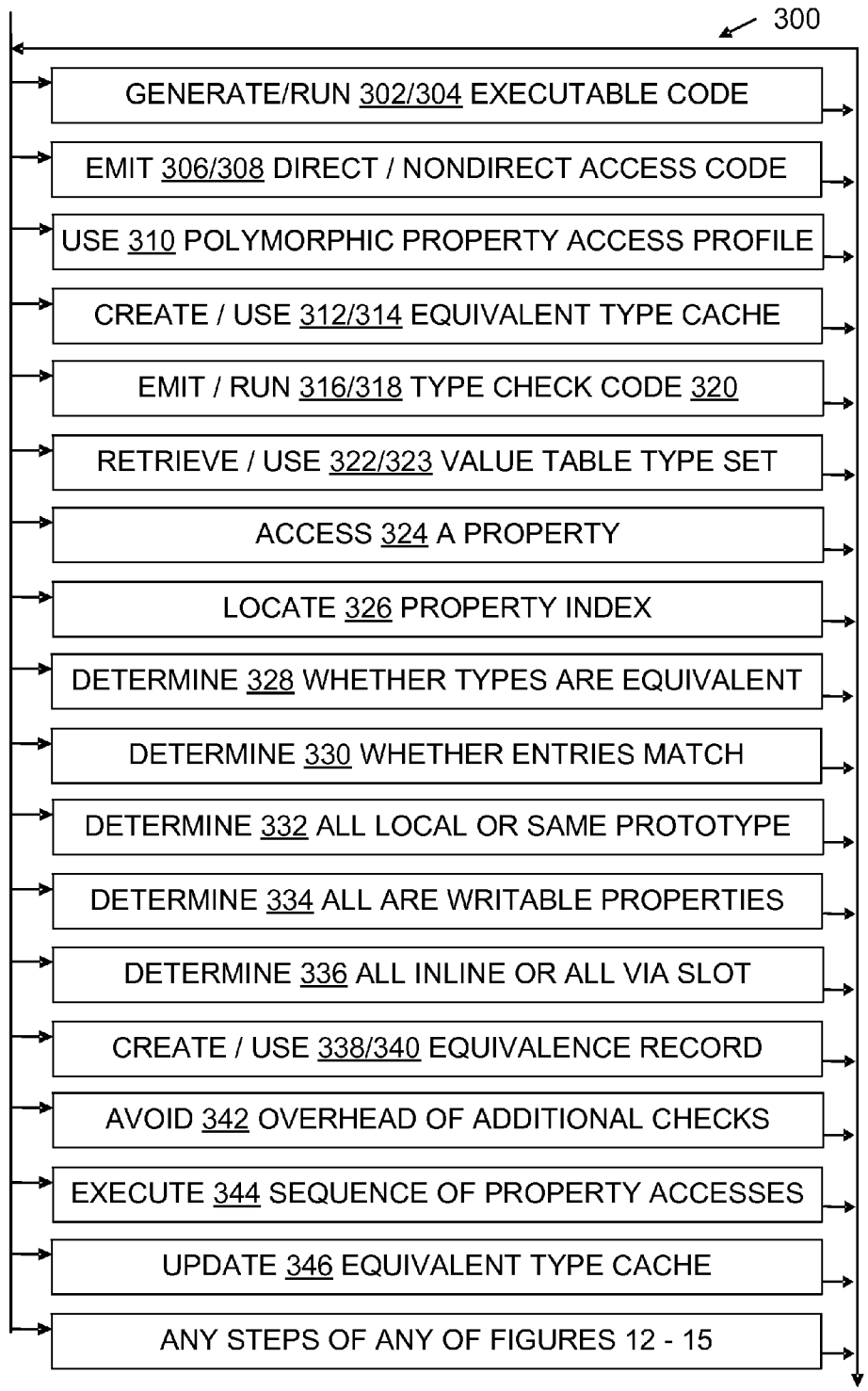
FIG. 3 is a flow chart illustrating steps of some processes and some configured storage media in generation and/or execution of property accesses.

FIG. 3 illustrates some process embodiments in a flowchart 300. Technical processes shown in the Figures or otherwise disclosed may be performed in some embodiments automatically, e.g., by a compiler code generator 202 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some examples, an algorithmic process for execution of a sequence of property accesses in a dynamically typed programming language using equivalent object type specialization is provided. For instance, the process may execute 344 a sequence of at least two dynamic type property accesses which are all guarded by a single type check.

In some cases, the process runs 304 code which does a type check using 314 an ETC 238 by comparing 318 an object type 212 to a designated guard type 1002 of an equivalent type cache 238. When the object type equals the designated guard type, then without running further type check code 320 (thereby avoiding 342 type check overhead), the process executes code 224 which accesses 324 a property's value at a hard-coded offset 226 into an object's memory 112, 216. When the object type does not equal the designated guard type, the process runs 318 type check comparison code 320 which compares the object type 212 to at least one secondary (non-initial) entry 236 of the equivalent type cache 238. When the type check comparison code 320 determines 330 that the object type matches any entry in the equivalent type cache, then without running further type check code (thereby avoiding 342 overhead) the process executes code for the sequence 208 of property accesses, with each property access either loading a property value or storing a property value, and with each non-initial property access accessing a location at a hard-coded offset into an object's memory. When the type check comparison code determines 330 that the object type does not match any entry in the equivalent type cache, then the process executes code which determines 328 whether the object type is equivalent to the types in the equivalent type cache with respect to the properties accessed. This determination 328 is made using 340 a property equivalence record which is associated with the equivalent type cache.

In some examples, the process updates 346 the equivalent type cache by inserting an object type 212 which was not initially found in any entry of the equivalent type cache during execution of the type check comparison code 320.

In some examples, the process executes multiple property accesses 206 into objects 126 of different types, but all the objects are equivalent with respect to the properties accessed. The different types have different layouts 214, and the layouts do not necessarily have any shared prefix of same-named properties at the same offsets. In some cases, the properties 204 accessed 324 are either all local, or else they all come from the same prototype. In some, the properties accessed are either all inline in a header 218 of an object, or else the properties accessed are all in an object's auxiliary slot array 244.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as optimized code generators 202, ETCs 238, and PERs 240, in the form of data 118 and instructions 116, read from a removable medium 114 and/or another source such as a network connection, to form a configured medium.

The configured medium 112 is capable of causing a computer system to perform technical process steps for property access code optimization as disclosed herein. FIGS. 1, 2, 6, 8, and 9-11 thus help illustrate configured storage media embodiments and process embodiments, as well as system and process embodiments. In particular, any of the process steps illustrated in FIGS. 3, 9, and/or 12-15, or otherwise taught herein, may be used to help configure a storage medium to form a configured medium embodiment. For scope of disclosure purposes, the discussion under this "Configured Media" heading is deemed to be duplicated under the "Processes" heading, and the discussion under the "Processes" heading is deemed to be duplicated under this "Configured Media" heading. Moreover, processes are also discussed elsewhere in this disclosure, under neither heading. Headings are for convenience only; they do not limit the scope or content of the teachings herein.

In some examples, a computer-readable storage medium 112 is configured with data 118 and with instructions 116 that when executed by at least one processor 110 causes the processor to perform an algorithmic process for generation 302 of machine code 124 for a sequence 208 of property accesses 206 in a dynamically typed programming language 130 using equivalent object type specialization. Some code generation 302 examples are described below. As noted previously, references to a polymorphic inline cache 246 may be replaced for scope of disclosure purposes by references to a polymorphic property access profile 232.

In some examples, a code generation 302 process includes the following. When types 212 in a polymorphic inline cache 246 of an object 126 are not equivalent, then an optimized code generator 202 emits 308 a nondirect property access code 228. A nondirect code 228 is code 124 which includes instructions 116 to use a polymorphic inline cache for at least one property access which does not begin the sequence of property accesses. When types in the object's polymorphic inline cache are determined 328 to be equivalent, but no type set 230 is available from a compiler value table 242 to compare with a cached type set computed from the object's polymorphic inline cache, then an optimized code generator 202 creates 312 an equivalent type cache 238 and emits 316 a type check code 320 for the property access 206 that begins the sequence of property accesses. When types in the object's polymorphic inline cache are equivalent, and a type set is retrieved 322 for use 323 from a compiler value table 242, but a polymorphic inline cached type set of the object does not match the type set retrieved from the compiler value table, then an optimized code generator 202 emits 308 a nondirect property access code. However, when types in the object's polymorphic inline cache are determined 328 to be equivalent, and the polymorphic inline cached type set of the object matches the type set retrieved 322 from the compiler value table, then an optimized code generator 202 emits 306 a direct property access code 224 which upon execution directly accesses 324 a property value at a hard-coded offset 226 in a memory region 216 of the property's object.

In some examples, emitting 308 a nondirect property access code 228 includes locating 326 a property's index 234 in an object type property map, which is more expensive (slower, more instructions to process) to emit and to execute than direct access code 224. The nondirect access code accesses the property value at a memory 112 location that is indicated by the property's index.

Figure 13:
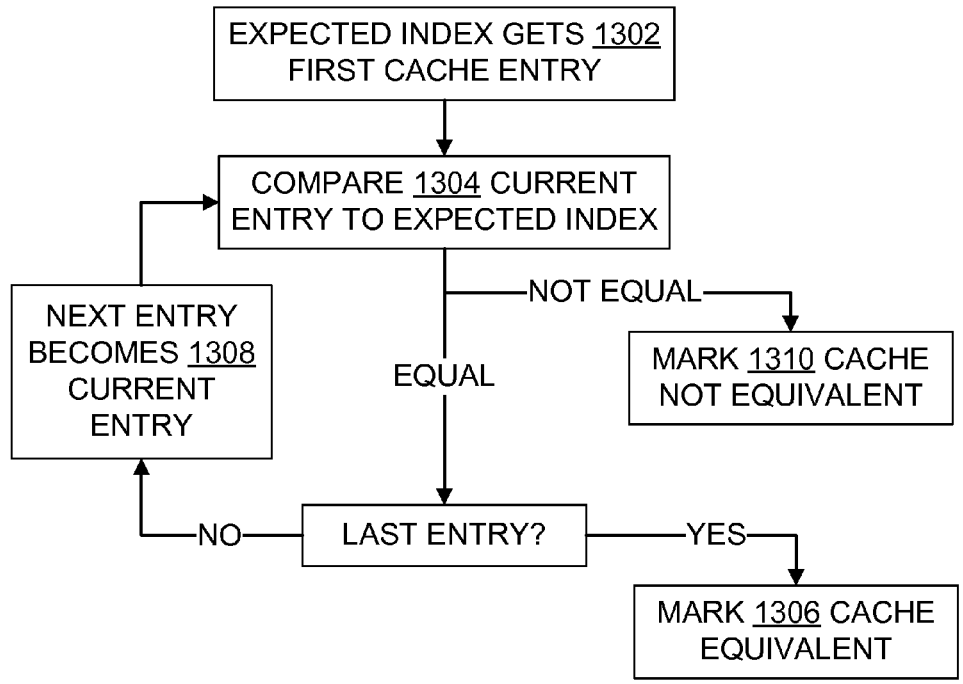
FIG. 13 is a data flow chart illustrating behavioral and structural aspects of executable code generation which uses cached polymorphic property access profile data to help optimize property accesses.

In some examples, types 212 in the object's polymorphic inline cache 246 or other property access profile 232 used 310 are determined 328 to be equivalent only after determining that all entries 236 of the polymorphic inline cache have the same value as a first entry of the cache. FIG. 13 illustrates one process for determining whether a set of types is equivalent for a given property access. That is, FIG. 13 depicts an algorithm which determines whether all types in a polymorphic inline cache are equivalent with respect to the property accessed. An expected index variable gets 1302 assigned the value of the first cache 246 entry 236. A loop occurs to walk through the entries, treating each entry in turn as the current entry. The current entry is compared 1304 to the expected index. If they are equal and the current entry is the last entry, the cache is marked 1306 as having only equivalent types 212 and the equivalence determination is complete. If the current entry and expected index are equal, but the current entry is not the last entry in the cache 246, then the next entry becomes 1308 the current entry and control loops as shown. If the current entry and expected entry are ever unequal, then the cache is marked 1310 as lacking equivalent types 212 (that is, as having at least two types that are not equivalent to one another), and the equivalence determination is complete.

In some examples, types in the object's equivalent type cache 238 are determined to be equivalent only after determining 332 that property accesses in a sequence will either all be local, or else will all be made to the same prototype. In some, types in the object's equivalent type cache 238 are determined to be equivalent only after determining 334 that all property stores in a sequence will be made to writable properties. In some, types in the object's equivalent type cache are determined to be equivalent only after determining 336 that properties to be accessed in a sequence of accesses are either all inline, or else will all be accessed through an auxiliary slot.

In some examples, uses of an equivalent type cache 238 are preceded by compiler creation 312 of the ETC 238. Creating an equivalent type cache 238 may be done at least in part by creating a cache which includes a designated guard type entry 1002 to hold a designated guard type. The designated guard type entry may be in a fixed size array which has space for multiple secondary entries to hold additional types.

Some examples include creating 338 a property equivalence record 240. The PER 240 has an entry for each property access 206 in a sequence of property accesses which is guarded by a single type check. FIG. 11 shows one implementation of a PER 240, tailored to environments that have nonwritable properties and auxiliary slot arrays.

Figure 12:
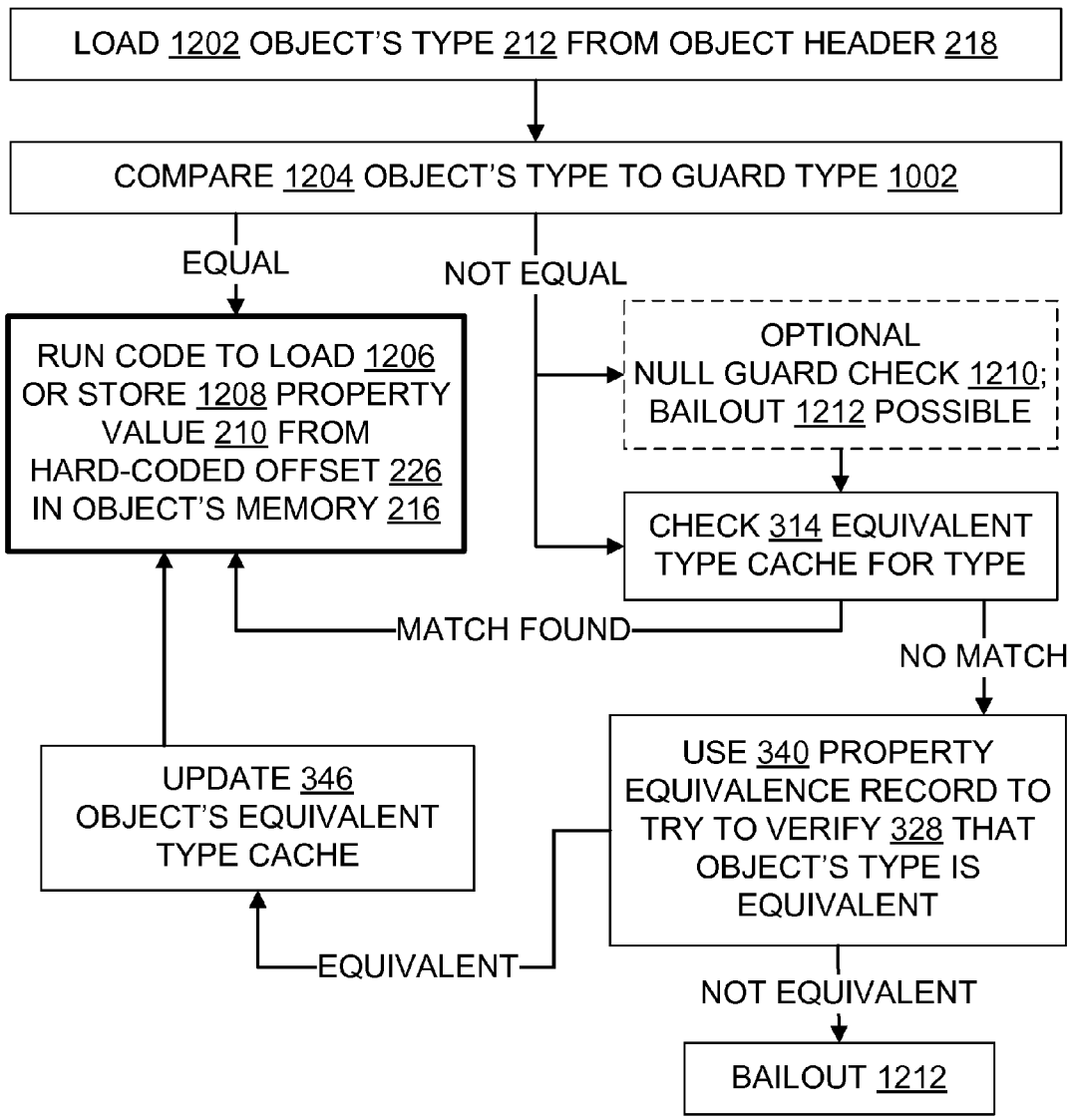
FIG. 12 is a data flow chart illustrating behavioral and structural aspects of emitted executable code which uses an equivalent type cache to help optimize object property accesses.
Figure 14:
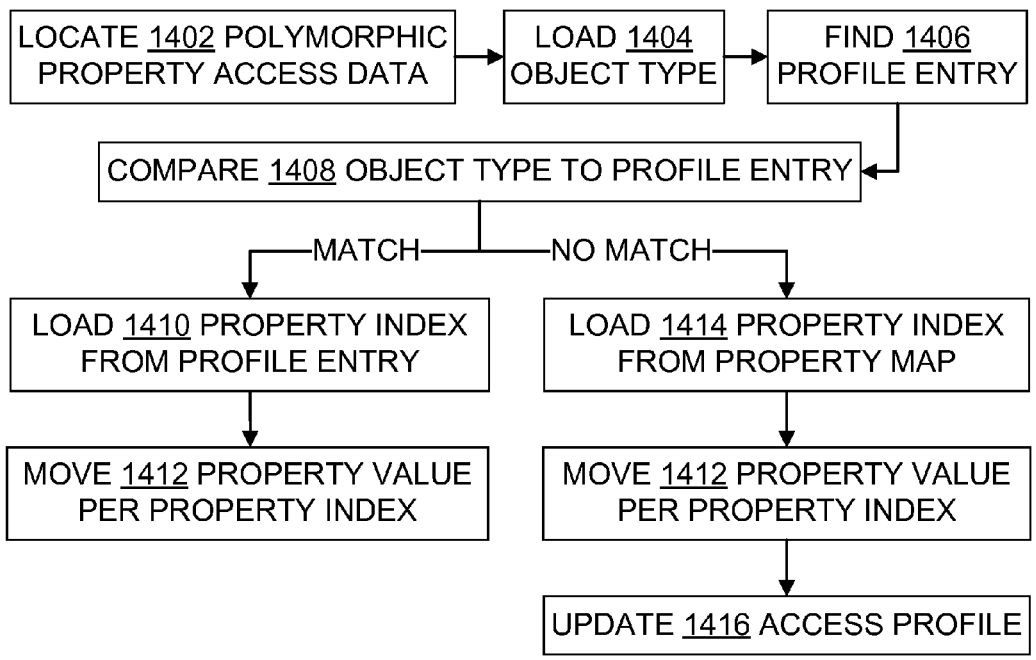
FIG. 14 is a data flow chart illustrating behavioral and structural aspects of polymorphic property access profile data collection and use.
Figure 15:
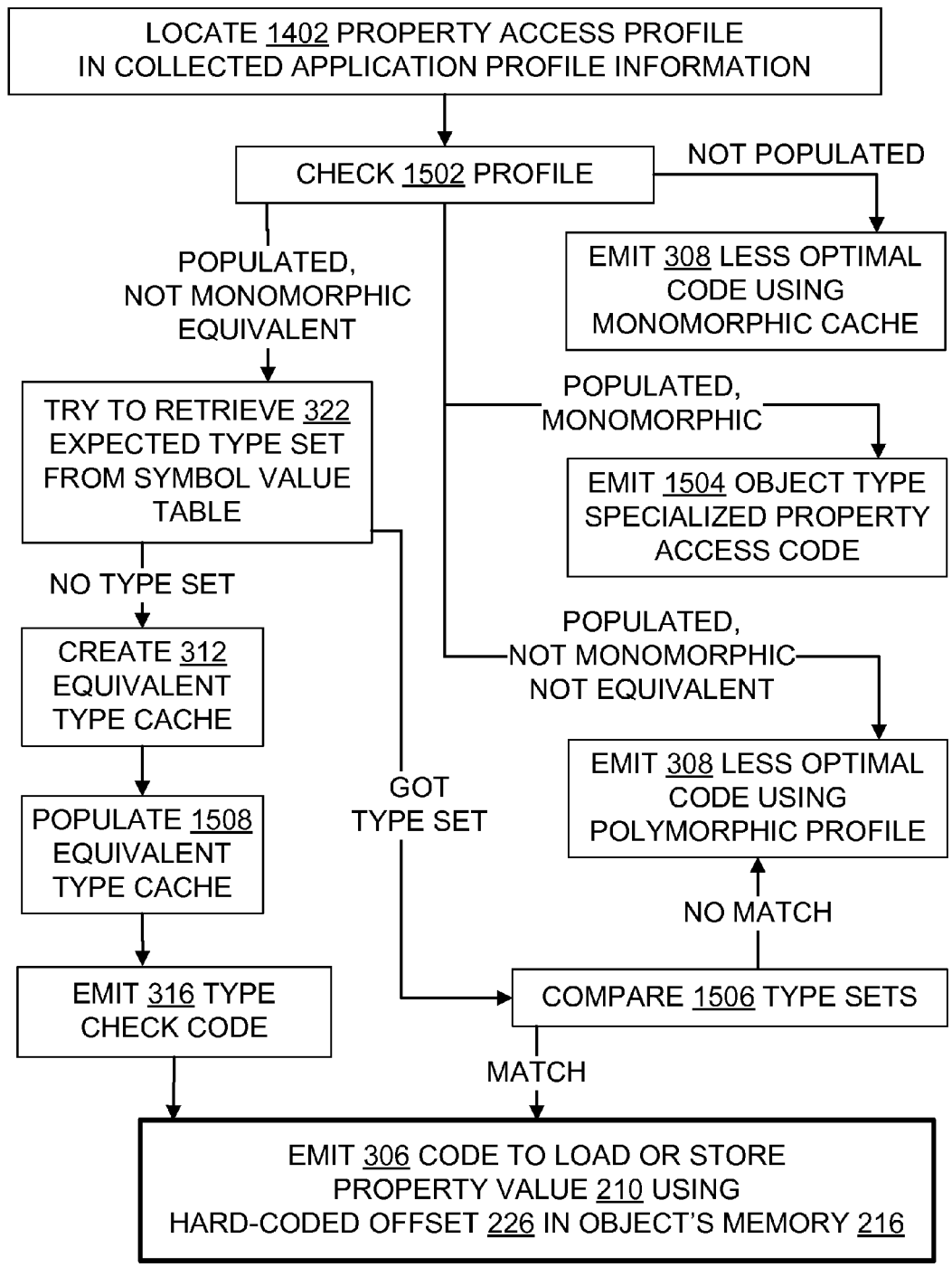
FIG. 15 is a data flow chart illustrating behavioral and structural aspects of executable code generation processes which have access to an equivalent type cache and polymorphic property access profile data to provide more optimal property accesses.

FIGS. 12, 14, and 15 further illustrate creation, population, and usage of PICs 246 (or other property access profiles 232) and/or ETCs 238 in some embodiments. In the context illustrated by FIG. 9, FIG. 14 illustrates activity which occurs primarily during execution and profile collection per block 902, FIG. 15 illustrates activity which occurs primarily during generation of optimized code per block 904, and FIG. 12 illustrates activity which occurs primarily during execution of optimized code per block 906. However, a person of skill will recognize that each Figure also helps illustrate activities that occur at other times because structures such as PICs and ETCs are created and/or used at various times.

FIG. 14 illustrates some processes for profile collection for polymorphic property access, including PIC population and use for faster property access. The process chart shown includes locating 1402 polymorphic property access data in collected profile information, loading 1404 an object type 212, finding 1406 a profile entry, and comparing 1408 the object type to the profile entry 236. If the object type matches the profile entry, the process loads the property's index 234 from the profile entry and moves 1412 the property value based on the property index. If the object type does not match the profile entry, the process loads 1414 the property's index 234 from the property map, moves 1412 the property value based on the property index, and updates 1416 the property access profile so the chance of finding a match is improved on the next comparison 1408.

As a particular example, consider the property access a.x in the example source code above. This access 206 has an associated PIC 246, denoted here as PIC1, which may be implemented for instance as an index into an array of PICs 246. One process consistent with FIG. 14 loads PIC1, loads 1404 the object type of object a from object a (see, e.g., FIG. 8 where object types are denoted TYP1 and TYP2) and locates 1406 a PIC1 cache entry for the object type, e.g., by using a hash table or a linear search. If the object type matches (the process has seen the object or its type before), then at runtime the process loads 1410 the property index from the PIC1 entry, and then loads or stores a property value 210 to the memory location on the object a that is indicated by the property index. If the object type does not match then a slower approach is used at runtime. The process locates 1414 the property index in the object type's property map (e.g., in layout 214), and loads or stores a property value 210 to the memory location on the object a that is indicated by the property index from the property map. Then the PIC1 entry is overwritten to update 1416 PIC1 with the object a's type and the property index from the property map 214.

FIG. 15 illustrates some processes for generating code that is optimized with regard to at least some property accesses. The process chart shown includes attempting to locate 1402 a property access profile in collection application profile information. This attempt returns a profile 232 which is not necessarily populated, so the process checks 1502 the profile 232 to see whether it is populated and what kind of information it contains. If the profile is not populated, then the process emits 308 less optimal nondirect code using monomorphic cache information, for example. If the profile is populated with monomorphic property access information, then the process emits 1504 object type specialized property access code, which may include a hard-coded offset 226. If the profile is populated with non-monomorphic property access information and type equivalence is not clearly present, then the process emits 308 less optimal nondirect code using polymorphic cache information, for example. If the profile is populated with non-monomorphic property access information but type equivalence is clearly present, then the process attempts to retrieve 322 a type set from the compiler value table. The value table contains the value of every symbol that is alive at a given point in the compilation, with semantic information, e.g., types for objects. "Value" here refers to a value in a value numbering algorithm, not the value that a given user variable will have on execution. If a type set is retrieved 322, then the access type set and the retrieved type set are compared 1506. If they do not match, then the process emits 308 less optimal nondirect code using polymorphic cache information, but if they do match, then the process emits 306 more optimal direct property access code. If no type set is retrieved 322, then the process creates 312 an ETC 238, populates 1508 the ETC with the types at hand, and emits 316 type checking code 320.

In some examples, a process consistent with FIG. 15 occurs during compilation, following the control flow of a compiled function and performing steps of FIG. 15 for each property access encountered. Generation of the optimized code occurs during compilation, in conjunction with analysis of the control flow of the compiled function to determine that for each optimized property access the compiler can correctly assume (or else ensure by emitting appropriate type check(s)) that only objects of equivalent types can ever reach that property access. Some examples use value tracking and numbering mechanisms to keep track of an expected type or a set of possible equivalent types for each object 126 whose property access(es) are to be optimized. Some also track all property access operations in every sequence that is to be optimized.

In some examples, a process consistent with FIG. 15 locates 1402 the property access data in the collected profile information. If the data is not populated, the process emits a less optimal code using the monomorphic cache, consistent with FIG. 14. If the data is populated, and monomorphic, then the process emits object type specialized property access code, again consistent with FIG. 14. If the populated data is not monomorphic, then the process checks whether equivalence is present, consistent with FIG. 13. If equivalence is not present, then the process emits a less optimal code using the polymorphic cache (PIC), consistent with FIG. 14. If equivalence is present, then the process tries to retrieve an expected type set for the object from the compiler symbol value table 242. The type set might be null. If a type set is not available, attention shifts from the PIC to an ETC. The process creates a new ETC consistent with FIG. 11, for instance, and populates it with information from the PIC, placing a first type as a guard 1002. Then the process emits type check code 320 that will load an object's type and compare it to the ETC guard type. Then the process emits 306 direct property value load/store code from/into a hard-coded offset in the object's memory. This is fast access code, potentially as fast as a monomorphic access even though polymorphism is present with different layouts. If a type set was available, the process compares the type sets. If they match, the process emits 306 direct property value load/store code from/into a hard-coded offset in the object's memory. If the type sets do not match, then full optimization is not appropriate, so the process emits less optimal code using PIC information.

In some examples, an optimized code generator (a.k.a. emitter) 202 uses information contained in PICs to decide whether equivalent object type optimization can be applied. If the generator 202 decides to apply the optimization, it will generate optimized code and create ETC(s), which the emitted code will then use when it is executed. The code generator uses information in the PICs to populate the ETCs, and the property equivalence records that ETCs contain (or are linked with). When the emitted code is later executed, it will operate on an object whose properties are to be loaded or stored. The emitted code will compare this object's type against the types in the ETC. If the type matches the guard type or any of the types in the eight-slot type array, the execution proceeds to load or store the property value directly 224 to the slot in the object's memory. If the object's type didn't match any of the types in the ETC, then the equivalence record from this ETC is used to determine if the object's type (presumably not encountered before) is actually equivalent to the types in the ETC with respect to the properties in this sequence. In other words, the property equivalence record is only used after a cache miss. The work done to determine equivalence of the object's type to the types in the ETC using the property equivalence record is somewhat similar to what the code generator does when it examines PICs, but is done during execution rather than during compilation.

FIG. 12 illustrates some processes for executing code that is optimized with regard to at least some property accesses. A process loads 1202 an object's type 212 from the object's header 218, and compares 1204 the object's type to the guard type 1002. If they are equal, then the code run next will be code to load 1206 or store 1208 a property value from a location which is at a hard-coded offset 226 into an object's allocated memory 216. If the object's type does not match the guard type, it may be because the guard is null. Some examples perform a check 1210 for a null guard, which is used in relatively unusual circumstances as a signal to bail out 1212 of code generated by a JIT compiler into an interpreted mode. This null guard bailout may occur, for example, when property is no longer writable, has been removed from a prototype, or has been hidden. The process checks 314 the ETC for the object's type; if a match is found, optimal code is run 304. If no match is found, the process uses 340 the PER to try and verify 328 that the object's type is equivalent to the guard type. If it is equivalent, the ETC is updated 346 and optimal code is run 304. Otherwise, the process bails out 1212 to the interpreter 136.

As a particular example, one process loads 1202 object a's type from the object a header, and compares the object a type with a guard type. In some examples, the location of the ETC is directly hard-coded in the machine code emitted. If the types are equal, the fastest code is run, which loads or stores a property value using a hard-coded offset into object a's memory. If the types are not equal, the code compares object a's type with each of the cached types in the ETC until a match is found or there are not more types. If a match is found, the fastest code is run, accessing a property value using a hard-coded offset into object a's memory. If no match is found in the ETC, code attempts to verify that object a's type is equivalent for this property access, using a PER in the ETC. If it is not equivalent, control bails out of the optimized code to the interpreter. If it is equivalent, code updates the ETC by inserting object a's type (that is, the address of the type's layout) into the ETC as the guard type.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs, specific memory addresses, specific property and object names, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from some Windows 9 "Threshold" documentation. Windows 9 is software implemented by Microsoft Corporation, and along "Threshold" refers generally in marketing or other materials (from third parties as well as Microsoft) to a version of the Microsoft® Windows® software (marks of Microsoft Corporation). Aspects of this software and/or documentation are consistent with or otherwise illustrate aspects of some of the embodiments described herein. However, it will be understood that such documentation and/or implementation choices do not necessarily constrain the scope of any examples or embodiments described herein, and likewise that "Windows 9 Threshold" code and/or its documentation may well contain features that lie outside the scope of such embodiments and examples. It will also be understood that some discussion herein is provided in part as an aid to readers who are not necessarily of ordinary skill in the art, and thus may contain and/or omit details whose recitation below is not strictly required to support the present disclosure.

Some teachings herein concern algorithms and implementations of Equivalent Object Type Specialization. Equivalent Object Type Specialization allows some sequences accessing polymorphic properties to be executed as efficiently as sequences with monomorphic properties, for a set of objects whose types are equivalent with respect to the properties used in the sequence. Under type equivalence as taught herein, two or more different object layouts (types) can have a common subset of properties which are located at matching offsets from the beginning of the object. The common subset may include, but is not limited to, properties at the beginning of an object's memory, and/or properties which are stored immediately adjacent to one another in memory. Such type equivalence can be used to optimize a sequence of polymorphic property operations, by optimistically emitting a sequence of memory accesses with hard-coded offsets guarded by a single type check at the beginning of the sequence, and then executing the optimistic sequence only when it is safe to do so.

Some teachings are directed at the design of an equivalent type cache. For example, an equivalent type cache may have a designated single type slot whose address can be hard-coded in the machine code, making the initial type check very efficient. The equivalent type cache may be used as a guard against changes to relevant attributes (offset, writability, and so on) of one or more properties in the guarded sequence of property accesses, such that a single type check protects against unexpected types and other changes in the environment at the same time. Some teachings concern algorithms for tracking which sequences of property access could be optimized by equivalent object type specialization, and/or algorithms for tracking properties (and their attributes) which are involved in equivalent object type specialized sequences.

In some examples, Equivalent Object Type Specialization involves a number of components and steps, which are noted below for convenient reference. As with other examples herein, the steps and structures noted may be omitted, duplicated, and/or combined by one of skill in any operable manner.

First, polymorphic inline caches are used during early code execution to record what object types have been encountered at each polymorphic property access. One polymorphic inline cache is associated with each property, such that for each type encountered, the polymorphic inline cache records the offset to the property in question on objects of that type.

Second, when a function has been executed a sufficient number of times it is queued up for optimized JIT compilation. In this context, a person of skill will determine what number of executions is a "sufficient" number based on circumstances such as how much testing the code has previously undergone and other release criteria, for example. In some cases, a single execution will be considered sufficient, while in other cases sufficiency is measured by relative code coverage (e.g., 75% of the instances of the function have been invoked) or by the size of the PIC or ETC (e.g., the function has been executed at least as many times as there are entries in either cache). During optimization, each polymorphic cache in that function is examined for type equivalence. A cache is considered equivalent and is flagged as such if its entries for all the types store the same offset, i.e., the property value is located at the same offset on all object layouts encountered so far by this property access. Care is taken to ensure the types are fully equivalent according to the semantics of the language used. For example, if the language supports prototypal inheritance (as JavaScript does), all properties should exist either on the instance itself, or be loaded from a prototype (a mix of the two is not equivalent). Similarly if the language permits property accessors as well as simple values (which JavaScript does), the property values on all types should be accessors, or should all be simple data properties, for the types to be considered equivalent. Finally, for property stores, all properties should be writable.

Third, during compilation data from each equivalent polymorphic cache is collected and associated with the corresponding property access. The set of equivalent types (type set) is a part of this data.

Fourth, as the program is analyzed, the optimizing compiler 202 tracks sequences 208 of property accesses 206 involving the same set of equivalent types (partially overlapping type sets are also considered in some examples) and marks them as candidates for equivalent type specialization. For each sequence identified, the compiler also keeps track of the properties involved, such that type equivalence can be verified at runtime, when appropriate.

Fifth, the compiler creates an equivalent object type specialization cache (ETC) for every identified property access sequence. The ETC contains the set of types that have already been verified to be equivalent, with a designated type slot that will be used by the type check at the beginning of the sequence in the emitted machine code. The ETC also serves as a guard, such that the entire machine code sequence may be invalidated (triggering a bailout) by setting this guard's value to zero, if conditions change, e.g., if one of the properties becomes read-only. Finally, the ETC includes a PER, or has an associated PER, that stores supplemental information about the properties involved and their attributes (e.g. read-only status) to help verify equivalence of any new incoming types.

Sixth, the compiler emits a machine code sequence starting with a type check against the guard slot of the cache as described above. Each subsequent property access is an indirect memory access operation from/to a hard-coded offset from the beginning of the object, without any additional runtime checks. If the type check succeeds, the rest of the memory loads/stores are executed as efficiently as in monomorphic object type specialization.

Seventh, if the type check fails, and the guard value is zero, the optimistic optimal code is no longer valid, and execution jumps directly to the bailout routine, from where it will continue in the interpreter.

Eighth, if the type check fails, but the guard value is non-zero, the optimistic optimal code is still valid and can be executed, as long as the type of the incoming object is equivalent with respect to the properties in the sequence. This equivalence test is implemented in two parts. First, the incoming type is compared to the set of types in the ETC. These types have been pre-verified to be equivalent, so if the incoming type matches any of them, execution continues according to the optimized property access path. This part can be emitted directly into the machine code for faster execution, or it can be the first part of a helper routine called by the emitted code upon the initial type check failure. Also, the check could involve a linear scan of the cached types, or a hash-based lookup, where the incoming type would be hashed into an index in the array of cached types.

Finally, if the incoming type doesn't match any type stored in the cache, it must be explicitly checked for equivalence. To that end the list of properties stored in the ETC along with the ancillary data about their required attributes is compared against properties of the incoming type. If this check succeeds, execution continues according to the optimized property access path. In addition, the ETC is updated (the new type is placed in the guard slot, and is added to the array of equivalent types, although it may displace another type). This way, on subsequent executions of this property access sequence, the initial type check will succeed, and the most optimal code will be executed. On the other hand, if this check fails, the incoming type is not equivalent and the subsequent machine instructions are not valid for the object being processed. Execution jumps directly to the bailout routine, and continues in the interpreter. In many examples, this time-consuming property-by-property check will be performed rarely, and most of the time the most optimal code path will be executed.

PICs and ETCs

Some examples herein make reference to two distinct kinds of cache. There are polymorphic inline caches (PICs) associated with each property access instruction, e.g., each of the instructions "a.x", "a.y", "b.x", and "b.y" in the example source code. PICs record the types of all objects encountered by that instruction. These caches that are examined to determine if the types they've recorded are equivalent or not. If the PIC types are equivalent then an embodiment tries to apply equivalent type specialization to the corresponding instruction. On the other hand, equivalent type caches (ETCs) are created when an embodiment chooses to optimize a sequence of property access instructions using equivalent type specialization. Each such sequence is given an equivalent type cache, which stores types that have previously been determined to be equivalent with respect to this property access sequence, to facilitate quick type checking. The two caches serve different purposes. Types in an equivalent type cache are already known to be equivalent, whereas types in a polymorphic inline cache may or may not be equivalent. In the drawings: FIG. 6 shows a PIC; FIG. 9 of an overall system refers to PICs (via property access profiles 232) and also refers to ETCs 238; FIG. 10 shows an ETC; FIG. 11 shows a PER which is structurally part of an ETC or is otherwise associated with an ETC; FIG. 12 refers to ETCs; FIGS. 13 and 14 each refer to PICs; and FIG. 15 refers to both PICs and ETCs.

Additional Combinations and Variations

A system S1 for generation and execution of code for property accesses in a dynamically typed programming language includes at least one processor, a memory in operable communication with the processor, and a direct access code generator which emits a direct access code for a property access to access a property of an object. The object has a type. The direct access code is emitted when types identified in a polymorphic inline cache corresponding to the property access are equivalent.

A system S2 for generation and execution of code for property accesses in a dynamically typed programming language includes at least one processor, a memory in operable communication with the processor, and a direct access code generator which emits a direct access code for a property access to access a property of an object. The object has a type. The direct access code is emitted when a type set retrieved from a polymorphic inline cache matches a type set that is associated with the object's type in a compiler value table.

A system S3 for generation and execution of code for property accesses in a dynamically typed programming language includes at least one processor, a memory in operable communication with the processor, and a generated direct access code for a property access to access a property of an object. The property access belongs to a sequence of property accesses. The object has a type and a memory region. The direct access code upon execution accesses a value of the property located at a hard-coded offset in the object's memory region, and accesses the value without requiring a further type check after a comparison type check determines that the object's type matches an entry in an equivalent type cache which is associated with the sequence of property accesses.

A system S4 for generation and execution of code for property accesses in a dynamically typed programming language includes a property equivalence record which includes one entry for each property access in a sequence of property accesses that is guarded by only a single type check, as opposed to being guarded by one type check per property access, even though the properties belong to types that have layout differences. The generated direct access code may contain a sequence of dynamic type property accesses which are all guarded by a single type check.

A system S1-3 includes both the direct access code generator of system S1 and the generated direct access code of system S3. A system S2-3 includes both the direct access code generator of system S2 and the generated direct access code of system S3. A system S1-2 includes the direct access code generator of system S1 which also operates as described for system S2. A system S1-2-3 includes the direct access code generator of system S1 which also operates as described for system S2, and includes the generated direct access code of system S3. Each of the other possible combinations also appear in respective examples, e.g., S1-2-4, S1-3-4, S2-3-4, S3-4, S2-4, and S1-4.

Any of the systems S1 S2, S3, S4 alone or in combination may be equipped with a means for determining whether types in the polymorphic inline cache are equivalent. Suitable means may include, for example, code stored in a memory and executable by a processor which operates such that types in a polymorphic inline cache which is associated with a given property access are determined to be equivalent only after determining that all entries of the polymorphic inline cache contain the same property index as a first entry of the polymorphic inline cache. Suitable means may also or alternately include, for example, code which operates such that types in a polymorphic inline cache associated with a given property access to a given property are determined to be equivalent only after determining that exactly one of the following conditions is satisfied: all types in the polymorphic inline cache describe objects which contain the given property, or else all types in the polymorphic inline cache describe objects that share a prototype and the prototype contains the given property. Suitable means may also or alternately include, for example, code which operates such that types in a polymorphic inline cache associated with a given property access to a given property are determined to be equivalent only after determining that exactly one of the following conditions is satisfied: all types in the polymorphic inline cache describe objects which hold the value of the given property in a slot on a header of the object, or else all types in the polymorphic inline cache describe objects which hold the value of the given property in a slot on an auxiliary slot array of the object. A polymorphic inline cache in the structural form illustrated by FIG. 6 (sizes may vary) or a functional equivalent may also be part of the stated means. An implementation of the algorithm shown in FIG. 13, or a functional equivalent, may be part of the stated means.

Polymorphic inline caches may be considered to be an implementation of a polymorphic property access profile. Mechanisms other than a fixed-size array cache may be used to effectively substitute "polymorphic property access profile" for "polymorphic inline cache" in any of the systems, configured media, or process descriptions provided in this section or elsewhere herein. For example, arrays which effectively grow may be used. One way to effectively grow an array is to allocate a larger array, copy the original array's data into it, and free the original array. Another way is to create a linked list, tree, hash table, or other linked structure which extends the space available to hold property profile data beyond the space in an original array.

With further attention to variations of system S4, in which the system includes the generated direct access code, and in which the generated direct access code contains a sequence of property accesses of accessed properties of objects of different types, in some cases said types are equivalent with respect to said accessed properties, when exactly one of the following conditions is satisfied: all accessed properties are local properties, or else each accessed property comes from a prototype and all of the accessed properties come from the same prototype. In some cases, the generated direct access code contains a sequence of property accesses of accessed properties of objects of different types, and wherein the property accesses are either all inline, or else all in an auxiliary slot array.

A computer-readable storage medium M1 is configured with data and with instructions that when executed by at least one processor causes the processor to perform an algorithmic process for generation of machine code for a sequence of property accesses in a dynamically typed programming language using equivalent object type specialization. In a particular example M1a, when types in a polymorphic inline cache of an object are not equivalent, the process emits a nondirect property access code, namely, a code which includes instructions to use a polymorphic inline cache for at least one property access which does not begin the sequence of property accesses. In a particular example M1b, when types in the object's polymorphic inline cache are equivalent, but no type set is available from a compiler value table to compare with a cached type set computed from the object's polymorphic inline cache, then the process creates an equivalent type cache and emits a type check code for the property access that begins the sequence of property accesses. In a particular example M1c, when types in the object's polymorphic inline cache are equivalent, and a type set is retrieved from a compiler value table, but a polymorphic inline cached type set of the object does not match the type set retrieved from the compiler value table, then the process emits a nondirect property access code. In a particular example M1d, when types in the object's polymorphic inline cache are equivalent, and the polymorphic inline cached type set of the object matches the type set retrieved from the compiler value table, then the process emits a direct property access code which upon execution directly accesses a property value at a hard-coded offset in a memory region of the object. The variants M1a, M1b, M1c, M1d may appear alone, or with one other variant (M1a+M1b, M1a+M1c, M1a+M1d, M1b+M1c, M1b+M1d, M1c+M1d), or with two other variants (M1a+M1b+M1c, M1a+M1b+M1d, M1a+M1c+M1d, M1b+M1c+M1d), or all of them may be present in a given example (M1a+M1b+M1c+M1d). Emitting a nondirect property access code may include locating a property's index in an object type property map and emitting code which accesses the property value at a memory location that is indicated by the property's index.

Types in the object's polymorphic inline cache may be determined to be equivalent in any of these combinations of M1a, M1b, M1c, and/or M1d only after determining that all entries of the polymorphic inline cache have the same value as a first entry of the cache. Types in the object's equivalent type cache may be determined to be equivalent in any of these combinations only after determining that property accesses in a sequence will either all be local, or else will all be made to the same prototype. Types in the object's equivalent type cache may be determined to be equivalent in any of these combinations only after determining that all property stores in a sequence will be made to writable properties. Types in the object's equivalent type cache may be determined to be equivalent in any of these combinations only after determining that properties to be accessed in a sequence of accesses are either all inline, or else will all be accessed through an auxiliary slot.

In any of these combinations of M1a, M1b, M1c, and/or M1d and their variations, creating an equivalent type cache may be done at least in part by creating a cache which includes a designated guard type entry to hold a designated guard type. The designated guard type entry may be located in a fixed size array which has space for multiple secondary entries to hold additional types.

In any of these combinations of M1a, M1b, M1c, and/or M1d and their variations, the process may include creating a property equivalence record having an entry for each property access in a sequence of property accesses which is guarded by a single type check.

Any of these combinations of M1a, M1b, M1c, and/or M1d and their variations may also be combined with any of the systems S1, S2, S3, S4 and their variations described above, by configuring memory 112 of the system in question and/or configuring a removable medium 114 of the system in question.

A process P1a for execution of a sequence of property accesses in a dynamically typed programming language using equivalent object type specialization includes running code which does a type check by comparing an object type to a designated guard type of an equivalent type cache. A process P1b includes executing code which accesses a property's value at a hard-coded offset into an object's memory, without running further type check code after an object type equals a designated guard type. A process P1c includes running type check comparison code which compares the object type to at least one secondary entry of the equivalent type cache when an object type does not equal a designated guard type. A process P1d includes executing code for a sequence of property accesses at a hard-coded offset in object memory without running further type check code after type check comparison code determines that an object type matches an entry in an equivalent type cache. Here, as elsewhere herein, "accessing" a property value means loading a property value from an object's memory region or storing a property value into an object's memory region. A process P1e includes executing code which determines whether an object type is equivalent to types in an equivalent type cache with respect to the properties accessed, by using a property equivalence record which is associated with the equivalent type cache.

In a first variant, the process includes executing a sequence of at least three dynamic type property accesses which are all guarded by a single type check. In a second variant, the process includes updating the equivalent type cache by inserting an object type which was not initially found in any entry of the equivalent type cache by execution of the type check comparison code. In a third variant, the process includes executing multiple property accesses into objects of different types, all of which objects are equivalent with respect to the properties accessed, and wherein properties accessed are either all local, or else all come from the same prototype. In a fourth variant, the process includes executing multiple property accesses involving objects of different types, wherein all types are equivalent with respect to the properties involved, and the properties accessed are either all inline in a header of an object, or else the properties accessed are all in an object's auxiliary slot array. Each variant may occur alone, or in combination with any one or more of the other variants. Each variant may occur with any of the processes P1a, P1b, P1c, P1d, P1e, and ach process may be combined with any one or more of the other processes. Moreover, each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 12-15 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system for generation and execution of machine code for property accesses in a dynamically typed programming language, the system comprising:
   at least one processor;
   a memory in operable communication with the processor; and
   at least one of the following:
   (a) a direct access code generator which emits a direct access code for a property access to access a property of an object, the object having a type, the direct access code being emitted when the following conditions are satisfied: types identified in a polymorphic inline cache corresponding to the property access are equivalent, and a type set retrieved from the polymorphic inline cache matches a type set that is associated with the object's type in a compiler value table;
   (b) a generated direct access code for a property access to access a property of an object, the property access belonging to a sequence of property accesses, the object having a type and a memory region, and wherein the direct access code upon execution accesses a value of the property located at a hard-coded offset in the object's memory region, and accesses the value without requiring a further type check after a comparison type check determines that the object's type matches an entry in an equivalent type cache which is associated with the sequence of property accesses; or
   (c) a property equivalence record which includes one entry for each property access in a sequence of property accesses that is guarded by a single type check.

2. The system of claim 1, wherein the system comprises both the direct access code generator and the generated direct access code.

3. The system of claim 1, wherein the system comprises the direct access code generator, and the direct access code generator operates according to at least one of the following:
   (a) entries of the polymorphic inline cache contain property indexes, and types in the polymorphic inline cache which is associated with a given property access are determined to be equivalent only after determining that all entries of the polymorphic inline cache contain the same property index as a first entry of the polymorphic inline cache; or
   (b) types in the polymorphic inline cache associated with a given property access to a given property are determined to be equivalent only after determining that exactly one of the following conditions is satisfied: all types in the polymorphic inline cache describe objects which contain the given property, or else all types in the polymorphic inline cache describe objects that share a prototype and the prototype contains the given property.

4. The system of claim 1, wherein the system comprises the direct access code generator, and wherein the direct access code generator operates such that types in the polymorphic inline cache associated with a given property access to a given property are determined to be equivalent only after determining that exactly one of the following conditions is satisfied: all types in the polymorphic inline cache describe objects which hold the value of the given property in a slot on a header of the object, or else all types in the polymorphic inline cache describe objects which hold the value of the given property in a slot on an auxiliary slot array of the object.

5. The system of claim 1, wherein the system comprises the generated direct access code, and wherein the generated direct access code contains a sequence of dynamic type property accesses which are all guarded by a single type check.

6. The system of claim 1, wherein the system comprises the generated direct access code, wherein the generated direct access code contains a sequence of property accesses of accessed properties of objects of different types, wherein said types are equivalent with respect to said accessed properties, and wherein exactly one of the following conditions is satisfied: all accessed properties are local properties, or else each accessed property comes from a prototype and all of the accessed properties come from the same prototype.

7. The system of claim 1, wherein the system comprises the generated direct access code, wherein the generated direct access code contains a sequence of property accesses of accessed properties of objects of different types, and wherein the property accesses are either all inline, or else all in an auxiliary slot array.

8. A computer-readable storage medium configured with data and with instructions that when executed by at least one processor causes the processor to perform an algorithmic process for generation of machine code for a sequence of property accesses in a dynamically typed programming language using equivalent object type specialization, the process comprising the steps of:
(a) when types in a polymorphic inline cache of an object are not equivalent, then emitting a nondirect property access code, namely, a code which includes instructions to use a polymorphic inline cache for at least one property access which does not begin the sequence of property accesses;
(b) when types in the object's polymorphic inline cache are equivalent, but no type set is available from a compiler value table to compare with a cached type set computed from the object's polymorphic inline cache, then creating an equivalent type cache and emitting a type check code for the property access that begins the sequence of property accesses;
(c) when types in the object's polymorphic inline cache are equivalent, and a type set is retrieved from a compiler value table, but a polymorphic inline cached type set of the object does not match the type set retrieved from the compiler value table, then emitting a nondirect property access code; and
(d) when types in the object's polymorphic inline cache are equivalent, and the polymorphic inline cached type set of the object matches the type set retrieved from the compiler value table, then emitting a direct property access code which upon execution directly accesses a property value at a hard-coded offset in a memory region of the object.

9. The configured storage medium of claim 8, wherein emitting a nondirect property access code comprises locating a property's index in an object type property map and emitting code which accesses the property value at a memory location that is indicated by the property's index.

10. The configured storage medium code of claim 8, wherein types in the object's polymorphic inline cache are determined to be equivalent only after determining that all entries of the polymorphic inline cache have the same value as a first entry of the cache.

11. The configured storage medium code of claim 8, wherein types in the object's equivalent type cache are determined to be equivalent only after determining that property accesses in a sequence will either all be local, or else will all be made to the same prototype.

12. The configured storage medium code of claim 8, wherein types in the object's equivalent type cache are determined to be equivalent only after determining that all property stores in a sequence will be made to writable properties.

13. The configured storage medium code of claim 8, wherein types in the object's equivalent type cache are determined to be equivalent only after determining that properties to be accessed in a sequence of accesses are either all inline, or else will all be accessed through an auxiliary slot.

14. The configured storage medium code of claim 8, wherein creating an equivalent type cache is done at least in part by creating a cache which includes a designated guard type entry to hold a designated guard type, and wherein the designated guard type entry is in a fixed size array which has space for multiple secondary entries to hold additional types.

15. The configured storage medium code of claim 8, wherein the process further comprises creating a property equivalence record having an entry for each property access in a sequence of property accesses which is guarded by a single type check.

16. An algorithmic process for execution of a sequence of property accesses in a dynamically typed programming language using equivalent object type specialization, the process comprising:
(a) running code which does a type check by comparing an object type to a designated guard type of an equivalent type cache;
(b) when the object type equals the designated guard type, then without running further type check code executing code which accesses a property's value at a hard-coded offset into an object's memory;
(c) when the object type does not equal the designated guard type, a processor running type check comparison code which compares the object type to at least one secondary entry of the equivalent type cache;
(d) when the type check comparison code determines that the object type matches any entry in the equivalent type cache, then without running further type check code executing code for the sequence of property accesses, each property access either loading a property value or storing a property value, each property access accessing a location at a hard-coded offset into an object's memory; and
(e) when the type check comparison code determines that the object type does not match any entry in the equivalent type cache, then executing code which determines whether the object type is equivalent to the types in the equivalent type cache with respect to the properties accessed, by using a property equivalence record which is associated with the equivalent type cache.

17. The process of claim 16, comprising executing a sequence of at least two dynamic type property accesses which are all guarded by a single type check.

18. The process of claim 16, further comprising updating the equivalent type cache by inserting an object type which was not initially found in any entry of the equivalent type cache by execution of the type check comparison code.

19. The process of claim 16, comprising executing multiple property accesses into objects of different types, all of which objects are equivalent with respect to the properties accessed, and wherein properties accessed are either all local, or else all come from the same prototype.

20. The process of claim 16, comprising executing multiple property accesses involving objects of different types, wherein all types are equivalent with respect to the properties involved, and the properties accessed are either all inline in a header of an object, or else the properties accessed are all in an object's auxiliary slot array.

* * * * *